M. SCHULTZ.

Steam-Pump.

No. 8,798. Reissued July 8, 1879.

Attest

Edgar J. Gross

Edw. Gurney.

Inventor

Michael Schultz by Hosea T. Ellsworth

Attorneys

N. PETERS, PHOTO-LITHOGRAPHER, WASHINGTON, D. C.

UNITED STATES PATENT OFFICE.

MICHAEL SCHULTZ, OF CINCINNATI, OHIO.

IMPROVEMENT IN STEAM-PUMPS.

Specification forming part of Letters Patent No. 204,619, dated June 4, 1878; Reissue No. 8,798, dated July 8, 1879; application filed March 8, 1879.

*To all whom it may concern:*

Be it known that I, MICHAEL SCHULTZ, of Cincinnati, Hamilton county, Ohio, have invented a new and useful Improvement in Steam-Pumps, of which the following is a full, clear, and exact description, reference being had to the accompanying drawings, forming part of this specification, and the letters of reference marked thereon.

My invention relates to that class of steam-pumps employing a steam and pumping piston combined, and acting in the same vertical line, and a "Scotch yoke" for imparting a rotary motion to a governing fly-wheel, and has for its object to improve the construction and efficiency of such pumps, besides cheapening the cost of their manufacture.

To this end my invention consists, first, in a semi-cylindrical shell arranged wholly upon one side of and around the pistons and yoke constituting the frame by which the steam-cylinder is connected with and supported above the pumping-cylinder, and which may be cast in one piece with them or with the pumping-cylinder and lower head of the steam-cylinder; second, in the arrangement of the support by which the driving-shaft is braced and the driving-shaft supported from the bed-plate; third, in a roller upon the wrist-rings of the crank-wheel operating in the yoke for the purpose of avoiding the friction and binding action incident to the use of a sliding box; fourth, in the means by which the yoke and roller are lubricated; fifth, in casting the cylinder-frame and pump in one piece, by which I secure a stronger and lighter construction, reduce the cost of manufacture, and secure a more perfect alignment of the working parts; sixth, in forming one-half the yoke and its connecting-piston in one piece, so that the same pattern can be used for both pump and steam pistons, thereby reducing the cost of manufacture and facilitating the adjustment and alignment of the parts; seventh, in the substitution of a crank-wheel and shaft in place of the ordinary crank-shaft which carries the governing fly-wheel, thus rendering the use of a roller and its attendant advantages practicable, and avoiding the disadvantage of a crank, as hereinafter more fully set forth.

Figure 1:
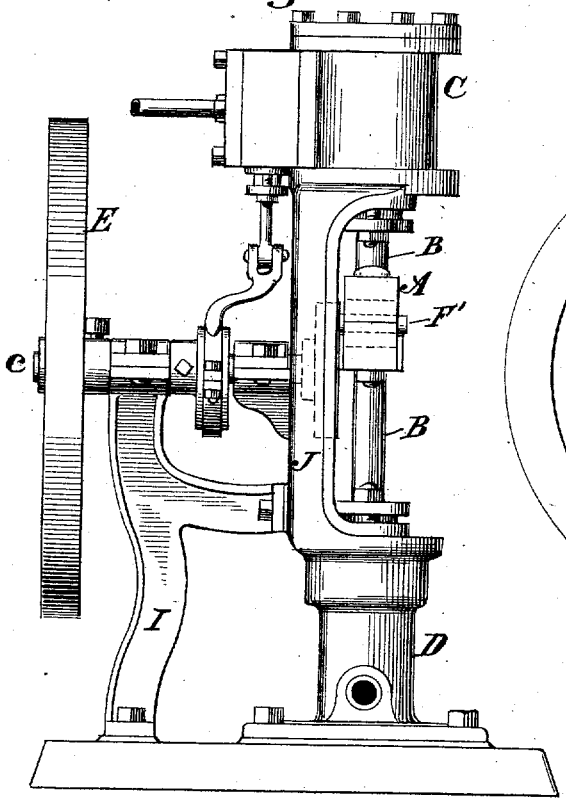
Figure 2:
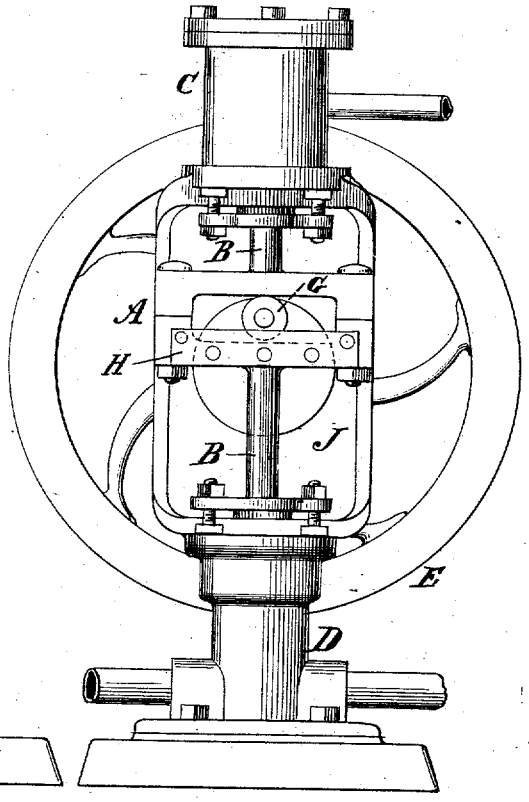
Figure 3:
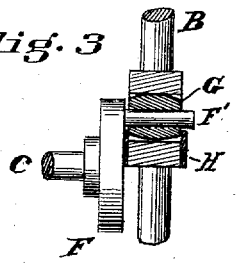
Figure 4:
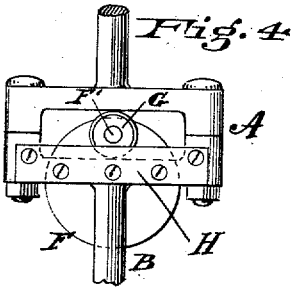

In the accompanying drawings, Figure 1 is a side elevation of a steam-pump embodying my invention. Fig. 2 is a front elevation of the same. Fig. 3 is a side elevation of the crank wheel and pin with the yoke and roller in section. Fig. 4 is a front elevation of the yoke and crank-wheel and their immediate connections.

C is the steam-cylinder, and D the pump-barrel, of the direct-acting steam-pump shown in the drawings. These parts are arranged in the same axial line, and between them operates the cross-head or yoke A formed in two parts, each of which is cast with a corresponding section of the piston B, which plays vertically between the steam and pumping cylinders C D.

By means of a roller, G, upon the crank-pin F′ of the crank-wheel F, moving laterally between the parallel faces of the yoke A, rotary motion is given to the shaft C and governing fly-wheel F, by which the slide-valve is operated and the movements of the pump regulated.

Pumps of this class have been constructed with a side brace connecting the two cylinders, but, being simply a brace or standard, and extending outward at some distance from the axial line of the cylinders, could not afford the necessary rigidity and strength to resist the lateral strains produced by the use of a yoke, which, therefore, was not employed therewith for imparting motion to a governing fly-wheel.

Furthermore, in this construction it would not be practicable to obtain in a side brace of this kind the necessary bearing for the fly-wheel shaft in the plane of the cylinder-axis, which was, therefore, placed out of the line of the propelling force, and operated by a crank and connecting-rod.

To obviate these disadvantages, and obtain a frame of the necessary lightness, strength, and lateral rigidity, which will allow the use of a yoke, and yet be entirely open upon one side, I employ a frame, J, in the form of a semi-cylindrical shell, extending around the pistons wholly upon one side. Through this frame in the plane of the cylinder-axis the driving-shaft passes, resting in a solid bearing within or upon it, while the crank-wheel operates within its concavity.

By this means several important advantages are secured, to wit: a solid bearing for the shaft near and in the plane of the pistons in the frame, a frame combining economy of metal and strength to resist lateral strains in both directions, and economy of space in the disposition of the parts, whereby the entire structure is rendered more compact and efficient, and also a ready access to all working parts.

In small pumps the frame J may be cast in one piece with the cylinders; but in larger constructions I prefer to cast the pump, frame, and lower head of the steam-cylinder in one piece, and bolt the steam-cylinder to its head independently.

This construction and arrangement of the parts enable me to introduce certain other advantages, among which is the substitution of the crank-wheel E in place of the ordinary crank-shaft, besides affording more convenient access to the yoke A and its connections, the pistons, and stuffing-boxes, for removal or repair.

The crank-shaft heretofore used in steam-pumps was usually, and preferably, forged from a single piece of metal, and, besides being expensive to construct, was peculiarly subject to injury in this kind of machinery. Any obstruction in the pump, such as scale from the boiler, (which is liable to be drawn into the pump,) which interfered with its full stroke, would almost invariably spring or break the crank-shaft, thus necessitating the frequent removal and repair of the entire shaft. These repairs were, of course, difficult and expensive to make, besides rendering the pump inoperative for a considerable period.

By substituting a crank-wheel, F, and pin F′ a much cheaper and stronger construction is secured, while the same causes of injury referred to in the case of a crank-shaft could only break or bend the crank-pin F′, which is easily and quickly replaced without disturbing any of the other parts.

The use of a crank-wheel is the more effective in connection with the frame before described, by which the main bearing of the shaft is in the frame itself, through which the shaft passes, and the other bearing upon a brace, I, supporting the frame J, and being itself supported from the bed-plate, as will be more particularly described hereinafter.

In connection with the crank wheel and pin I dispense entirely with the sliding box heretofore used with a yoke and substitute therefor a roller, G, upon the crank-pin F′.

The disadvantages of the sliding box device in pumps of this class are well known. Besides the initial expense of making and fitting them, they require for their operation an absolutely true and perfect adjustment and movement of the connecting parts. This being in practice generally impossible to obtain or maintain, great friction and binding of the parts insured, and the movement of the fly-wheel was generally unreliable, besides entailing frequent and expensive renewal and repair. These disadvantages are entirely obviated by the use of the roller G, which fits freely upon the crank-pin F′, and plays between the parallel faces of the yoke A. The roller is not in the form of a perfect cylinder, but presents a slightly larger diameter in the center than at the ends, being curved uniformly in both directions. This enables the roller to reciprocate freely and uninterruptedly in the yoke should the parts from irregularity of expansion and contraction or other causes lose their perfect alignment.

By the rolling movement of the roller always in the same direction upon its axis, but in opposite directions in the yoke laterally as the one face or the other of the yoke-slot presses against it, the friction incident to the sliding movement of the box is entirely avoided, as also the wear of the parts necessarily resulting therefrom.

In order to secure the roller within the slot of the yoke and upon the crank-pin I use upon the lower part of the yoke flanges H, which rise above the lower boundary of the slot upon both sides between the ends thereof. There is thus formed, in connection with the lower face of the slot, a trough for the retention of oil, which materially aids in keeping the parts properly lubricated. These flanges are secured in position by screws or in any other suitable manner upon the exterior surface of the yoke, or may be cast therewith.

In forming the pistons and yoke, I cast one-half the yoke A and its contiguous piston B together as one piece. Two of them, when placed together and united by bolts, as shown in the drawings, form a substantially continuous piston with the yoke between. By this means the alignment of the piston and yoke is perfectly and invariably secured, with a great saving of labor and expense.

The advantages of this construction are important. The two parts may be cast from the same pattern, and each entirely finished in the lathe in one operation. Thus the alignment of the pistons with reference to each other and to the yoke-slot is easily, economically, and accurately secured, and a much stronger, simpler, and more perfect connection secured than can be obtained in any other construction. Besides this, when it is necessary to remove the shaft and crank-wheel from the pump, it is only necessary to remove the two bolts securing the parts together, force the pistons to the extremities of their stroke, when the shaft and wheel can be removed or replaced between the separated parts of the yoke with facility and dispatch.

The support I, which forms the outer bearing for the driving-shaft C, consists of an upright standard bolted below to the bed-plate upon which the pump rests, and having a lateral arm extending to and secured to the frame J by bolts or otherwise. The upright standard sustains the driving-shaft in a suitable journal-bearing, the other bearing of the shaft being in the frame J itself, or upon a suitable pillow-block cast with it. This arrangement of the parts not only furnishes the additional bearing required for the shaft, but also a lateral brace for the pump-frame.

The mode of operation has been already sufficiently indicated in the description of the various parts, and will be readily understood by reference thereto.

Having described my invention, I claim and desire to secure by Letters Patent—

1. In combination with the steam and pumping cylinders of a direct-acting steam-pump employing a shaft and governing fly-wheel operated by a yoke device, a semi-cylindrical shell-frame, J, arranged wholly upon one side of the pistons and connecting the cylinders, substantially as and for the purpose specified.

2. The combination and arrangement of the semi-cylindrical shell-frame J, the driving-shaft C, passing through and having a bearing in the frame in the plane of the cylinder-axis, and the crank-wheel F, operating in the concavity of the frame, substantially as specified.

3. The roller G, in combination with the yoke A, crank-pin F′, crank-wheel F, and driving-shaft *e*, substantially as and for the purpose set forth.

4. In combination with yoke A and roller G, the flanges H, substantially as and for the purpose described.

5. In combination with the steam and pumping cylinders and shaft-connections of a direct-acting steam-pump, the pistons B and separable yoke A, each part of the yoke and its contiguous piston being cast together as one piece, substantially as and for the purpose specified.

In testimony whereof I have hereunto set my hand this 4th day of March, 1879.

MICHAEL SCHULTZ.

Witnesses:
L. M. HOSEA,
E. A. ELLSWORTH.